(12) United States Patent
Kawauchi et al.

(10) Patent No.: US 9,507,285 B2
(45) Date of Patent: Nov. 29, 2016

(54) FERRITE PARTICLES AND ELECTROPHOTOGRAPHIC DEVELOPMENT CARRIER USING SAME, ELECTROPHOTOGRAPHIC DEVELOPER AND METHOD OF MANUFACTURING FERRITE PARTICLES

(71) Applicants: DOWA ELECTRONICS MATERIALS CO., LTD., Tokyo (JP); DOWA IP CREATION CO., LTD., Okayama, Okayama (JP)

(72) Inventors: Takeshi Kawauchi, Okayama (JP); Shou Ogawa, Okayama (JP); Yukihiro Matsuda, Okayama (JP)

(73) Assignees: DOWA ELECTRONICS MATERIALS CO., LTD., Tokyo (JP); DOWA IP CREATION CO., LTD., Okayama (JP)

( * ) Notice: Subject to any disclaimer, the term of this patent is extended or adjusted under 35 U.S.C. 154(b) by 0 days.

(21) Appl. No.: 14/773,973

(22) PCT Filed: Feb. 26, 2014

(86) PCT No.: PCT/JP2014/054591
§ 371 (c)(1),
(2) Date: Sep. 9, 2015

(87) PCT Pub. No.: WO2014/156437
PCT Pub. Date: Oct. 2, 2014

(65) Prior Publication Data
US 2016/0041487 A1 Feb. 11, 2016

(30) Foreign Application Priority Data
Mar. 28, 2013 (JP) .................... 2013-069622

(51) Int. Cl.
G03G 9/107 (2006.01)
C01G 49/00 (2006.01)
G03G 9/08 (2006.01)
G03G 9/113 (2006.01)

(52) U.S. Cl.
CPC ........... *G03G 9/107* (2013.01); *C01G 49/0036* (2013.01); *C01G 49/0072* (2013.01);
(Continued)

(58) Field of Classification Search
CPC ...................................... G03G 9/107
See application file for complete search history.

(56) References Cited

U.S. PATENT DOCUMENTS 7,824,833 B2  11/2010 Kayamoto et al.
8,865,386 B2  10/2014 Kawauchi et al.
(Continued)

FOREIGN PATENT DOCUMENTS

CN  102667632  9/2012
JP  H10-104884 A  4/1998
(Continued)

OTHER PUBLICATIONS

Jun. 3, 2014 International Search Report issued in International Patent Application No. PCT/JP2014/054591.

*Primary Examiner* — Hoa V Le
(74) *Attorney, Agent, or Firm* — Oliff PLC

(57) ABSTRACT

There are provided ferrite particles in which Mn ferrite is used as the main phase and which contain Sr ferrite, where the degree of projections and recesses in the surface of the particles falls within a range of 2.5 to 4.5 μm, and the standard deviation of the size of grains appearing on the surface of the particles falls within a range of 1.5 to 3.5 μm. In this way, a coating resin is left on the surface of the particles even after long-term use and thus a decrease in the charging property is reduced.

3 Claims, 2 Drawing Sheets

(52) U.S. Cl.
CPC ........... *G03G9/0806* (2013.01); *G03G 9/1136* (2013.01); *C01P 2004/03* (2013.01); *C01P 2004/61* (2013.01); *C01P 2006/10* (2013.01); *C01P 2006/42* (2013.01)

(56) References Cited

U.S. PATENT DOCUMENTS

2009/0130587 A1    5/2009    Kayamoto et al.
2013/0011780 A1    1/2013    Kawauchi et al.

FOREIGN PATENT DOCUMENTS

| | | |
|---|---|---|
| JP | H11-251126 A | 9/1999 |
| JP | 2001-022123 A | 1/2001 |
| JP | 2006-053201 A | 2/2006 |
| JP | 2011-141542 A | 7/2011 |
| WO | 2007/063933 A1 | 6/2007 |

FERRITE PARTICLES AND ELECTROPHOTOGRAPHIC DEVELOPMENT CARRIER USING SAME, ELECTROPHOTOGRAPHIC DEVELOPER AND METHOD OF MANUFACTURING FERRITE PARTICLES

TECHNICAL FIELD

The present invention relates to ferrite particles whose surface is formed in the shape of projections and recesses and which have a predetermined magnetic property and an electrophotographic development carrier (hereinafter also referred to as a "carrier" in short) using such ferrite particles, an electrophotographic developer (hereinafter also referred to as a "developer" in short) and a method of manufacturing ferrite particles.

BACKGROUND ART

For example, in an image forming device using an electrophotographic system, such as a facsimile, a printer or a copying machine, a toner is adhered to an electrostatic latent image formed on the surface of a photosensitive member to visualize it, the visualized image is transferred to a sheet or the like and thereafter it is fixed by being heated and pressurized. In terms of achieving high image quality and colorization, as a developer, a two-component developer containing a carrier and a toner is widely used.

In a development system using a two-component developer, a carrier and a toner are agitated and mixed within a development device, and the toner is charged by friction so as to have a predetermined amount. Then, the developer is supplied to a rotating development roller, a magnetic brush is formed on the development roller and the toner is electrically moved to the photosensitive member through the magnetic brush to visualize the electrostatic latent image on the photosensitive member. The carrier after the movement of the toner is left on the development roller, and is mixed again with the toner within the development device. Hence, as the properties of the carrier, a magnetic property for forming the magnetic brush, a charging property for providing a desired charge to the toner and durability for repeated use are required.

Hence, so-called coating carriers in which the surfaces of magnetic particles such as magnetite and various types of ferrite are coated with a resin are used more widely than ever. However, a coating resin layer on the surface of the particles wears out such as by long-term agitation within the development device. When the overall coating resin layer on the surface of the particles wears out, the charging property of the carrier is lowered and a charging failure of the toner occurs, with the result that the image quality is lowered.

Patent document 1 proposes that in order to enhance an adhesion strength to a coating resin layer, in ferrite particles having a specific composition, minute projections and recesses be formed in the surface of crystal grains. Patent document 2 also proposes that projections and recesses of a finely striped pattern be formed in the surface of ferrite particles.

RELATED ART DOCUMENT

Patent Document

Patent document 1: Japanese Unexamined Patent Application Publication No. 10-104884 (scope of claims, paragraph [0029] and the like)

Patent document 2: International Publication No. WO2007/63933

DISCLOSURE OF THE INVENTION

Problems to be Solved by the Invention

In the ferrite particles proposed in patent document 1, the depth of the projections and recesses formed in the surface of the crystal grains is preferably equal to or less than 0.5 μm, and even in the ferrite particles proposed in patent document 2, the projections and recesses in the surface of the particles have a striped pattern, and thus it can be considered that the overall coating resin layer on the surface of the particles equally wears out by long-term use. Hence, it is impossible to sufficiently reduce a decrease in the charging property of the carrier.

The present invention is made in view of the conventional problem described above, and an object thereof is to provide ferrite particles in which a coating resin is partially left on the surface of the particles even after long-term use and thus a decrease in the charging property is reduced.

Another object of the present invention is to provide an electrophotographic development carrier and an electrophotographic developer with which the charging performance is stably maintained.

Yet another object of the present invention is to provide a method of efficiently manufacturing ferrite particles in which the degree of projections and recesses in the surface of the particles falls within a specific range and in which variations in the size of grains appearing on the surface of the particles fall within a predetermined range.

Means for Solving the Problem

To achieve the above objects, in the present invention, there are provided ferrite particles in which Mn ferrite is used as the main phase and which contain Sr ferrite, where the degree of projections and recesses in the surface of the particles falls within a range of 2.5 to 4.5 μm, and the standard deviation of the size of grains appearing on the surface of the particles falls within a range of 1.5 to 3.5 pmn.

In the present specification, the "degree of projections and recesses" and the "standard deviation" are values that are measured based on measurement methods described in examples.

In the present invention, an electrophotographic development carrier is provided where the surface of the ferrite particles is coated with a resin.

Furthermore, in the present invention, an electrophotographic developer is provided which includes the electrophotographic development carrier and a toner.

Moreover, in the present invention, there is provided a method of manufacturing ferrite particles, the method including: a step of putting a Fe component raw material, a Mn component raw material and Sr ferrite particles whose volume average particle diameter falls within a range of 1.0 to 4.5 μm into a dispersion medium to obtain a slurry; a step of spraying and drying the slurry to obtain granules; and a step of firing the granules to obtain a fired product.

The added amount of the Sr ferrite particles preferably falls within a range of 2.5 to 15 wt %.

Advantages of the Invention

In the ferrite particles of the present invention, a coating resin is partially left on the surface of the particles even after long-term use and thus a decrease in the charging property is reduced.

In the electrophotographic development carrier and the electrophotographic developer of the present invention, the charging performance can be stably maintained.

In the manufacturing method of the present invention, it is possible to efficiently manufacture ferrite particles in which the degree of projections and recesses in the surface of the particles falls within a specific range and in which variations in the size of grains appearing on the surface of the particles fall within a predetermined range.

DESCRIPTION OF EMBODIMENTS

The ferrite particles of the present invention will first be described. One of the major features of the ferrite particles according to the present invention is that the degree of projections and recesses in the surface of the particles falls within a range of 2.5 to 4.5 μm. In this way, when the surface of the ferrite particles is coated with a resin, since the coating resin of the recess portions does not wear out even after long-term use, a decrease in the charging property is reduced. When the degree of projections and recesses in the surface of the particles is less than 2.5 μm, the overall coating resin uniformly wears out whereas when the degree of projections and recesses in the surface of the particles exceeds 4.5 μm, the fluidity of the ferrite particles is extremely degraded, and thus the charging property of a toner is lowered when the ferrite particles are used as a carrier core material. The degree of projections and recesses in the surface of the particles preferably falls within a range of 3.1 to 4.5 μm.

Another of the major features of the ferrite particles according to the present invention is that the standard deviation of the size of grains appearing on the surface of the particles falls within a range of 1.5 to 3.5 μm. Since as described above, variations in the size of the grains are somewhat produced, and moreover, as described above, the degree of projections and recesses in the surface of the particles falls within the range, when the surface of the particles is coated with a resin, the coating resin on the surface of the ferrite particles is prevented from wearing out uniformly, the coating resin is left on the recess portions and a decrease in the charging property is reduced.

Figure 2:
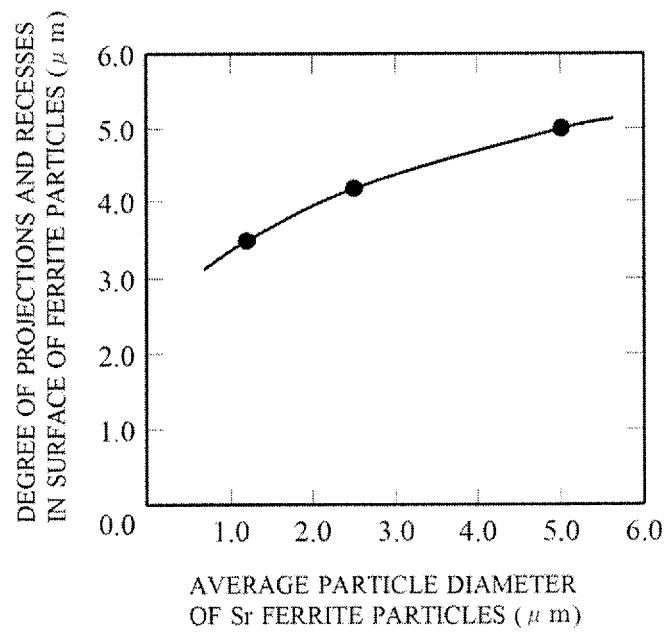
FIG. 2 A diagram showing a relationship between the average particle diameter of Sr ferrite particles and the degree of projections and recesses in the surface of the ferrite particle.
Figure 3:
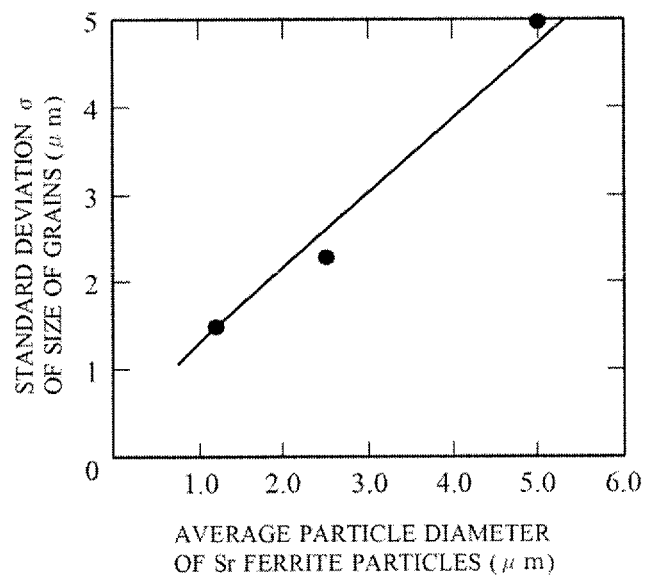
FIG. 3 A diagram showing a relationship between the average particle diameter of the Sr ferrite particles and the standard deviation a of the size of grains on the surface of the ferrite particles.

In order to make the degree of projections and recesses in the surface of the ferrite particles and the standard deviation of the size of the grains fall within the ranges described above, as will be described later, it is important to use Sr ferrite particles as the raw material of the ferrite particles and to adjust the average particle diameter of the Sr ferrite particles. FIG. 2 shows a relationship between the average particle diameter of the Sr ferrite particles and the degree of projections and recesses in the surface of the ferrite particles. FIG. 3 shows a relationship between the average particle diameter of the Sr ferrite particles and the standard deviation of the size of the grains appearing on the surface of the ferrite particles.

As understood from FIG. 2, the average particle diameter of the Sr ferrite particles used as the raw material is substantially proportional to the degree of projections and recesses in the surface of the ferrite particles, and when the average particle diameter of the Sr ferrite particles serving as the raw material is increased, the degree of projections and recesses in the surface of the ferrite particles obtained is increased. Moreover, as understood from FIG. 3, the average particle diameter of the Sr ferrite particles used as the raw material is substantially proportional to the standard deviation of the size of the grains appearing on the surface of the ferrite particles, and when the average particle diameter of the Sr ferrite particles serving as the raw material is increased, the standard deviation of the size of the grains appearing on the surface of the ferrite particles is also increased.

It is estimated that the reason why as described above, the Sr ferrite particles are used as the raw material to increase the degree of projections and recesses in the surface of the ferrite particles obtained and variations in the grains appearing on the surface of the ferrite particles is that crystal growth in the vertical direction is facilitated by using the Sr ferrite particles serving as the raw material as a seed crystal, and consequently, the degree of projections and recesses in the surface of the ferrite particles obtained and variations in the grains appearing on the surface of the ferrite particles are increased.

The average particle diameter of the Sr ferrite particles used as the raw material falls within a range of 1.0 to 4.5 μm. More preferably, it falls within a range of 1.0 to 3.5 μm. The average particle diameter of the Sr ferrite particles is made to fall within the range described above, and thus the degree of projections and recesses in the surface of the ferrite particles obtained and the standard deviation of the size of the grains are more likely to fall within the specified range of the present invention.

Since in the ferrite particles of the present invention, Mn ferrite is used as the main phase, the magnetic property and the electrical resistance desired are more likely to be obtained.

The volume average particle diameter of the ferrite particles of the present invention preferably falls within a range of 10 to 100 μm. When the volume average particle diameter is equal to or more than 10 μm, a necessary magnetic force is reliably applied to each of the particles, and for example, when the ferrite particles are used as an electrophotographic development carrier, the adhesion of the carrier to a photosensitive member is reduced. On the other hand, when the volume average particle diameter is equal to or less than 100 μm, it is possible to satisfactorily maintain image properties. In order to make the average particle diameter of the ferrite particles fall within the range described above, it is preferable to use a sieve or the like to perform classification processing either in the step of manufacturing the ferrite particles or after the manufacturing step. The distribution of the particle diameter is preferably sharp.

The apparent density of the ferrite particles of the present invention is preferably equal to or less than 2.5 g/cm$^3$. When the apparent density is equal to or less than 2.5 g/cm$^3$, and for example, the ferrite particles are used as a carrier core material, the agitation power of a developer containing the carrier can be reduced.

The magnetization $\sigma_{lk}$ of the ferrite particles of the present invention in an external magnetic field of $79.58 \times 10^3$ A/m (1000 oersteds) preferably falls within a range of 50 to 60 A·m²/kg. The magnetization $\sigma_{lk}$ of the ferrite particles is made to fall within this range, and thus for example, when the ferrite particles are used as a carrier core material, the coercive force of a magnetic brush is sufficiently acquired, with the result that the adhesion of the carrier to the photosensitive member is reduced.

The ferrite particles of the present invention can be used for various types of applications. Examples of the application include an electrophotographic development carrier, an electromagnetic wave absorbing material, an electromagnetic wave shielding material powder, a filler and a reinforcing material for rubber and plastic and a matting material, a filler and a reinforcing material for paint, pigment and adhesive. Among them, in particular, the ferrite particles are preferably used as an electrophotographic development carrier.

A method of manufacturing the ferrite particles of the present invention is not particularly limited but a manufacturing method described below is preferably used.

A raw material of Fe, a raw material of Mn and the ferrite particles are weighed, are put into a dispersion medium and are mixed, with the result that a slurry is produced. As the raw material of Fe, $Fe_2O_3$ powder, a Fe oxide, a Fe hydroxide or the like can be used, as the raw material of Mn, $MnFe_2O_4$ calcined powder, a Mn oxide, a Mn hydroxide or the like can be used and as the Sr ferrite particles, $SrO \cdot nFe_2O_3$ (n=0.5 to 6.5) can be used, and more preferably $SrO \cdot 6Fe_2O_3$ is preferably used. The solid content concentration of the slurry preferably falls within a range of 50 to 90 wt %. The added amount of Sr ferrite particles preferably falls within a range of 2.5 to 15 wt %. As described above, the average particle diameter of the Sr ferrite particles falls within a range of 1.0 to 4.5 μm.

Before the raw material of Fe and the raw material of Mn serving as the raw materials are put into the dispersion medium, as necessary, pulverizing and mixing processing and then calcining may be performed. In order to achieve the intended average particle diameter of the Sr ferrite particles, as necessary, wet-dry pulverization processing may be performed.

As the dispersion medium used in the present invention, water is preferably used. As the dispersion medium, in addition to the raw material of Fe, the raw material of Mn, the Sr ferrite particles and the like, as necessary, a binder, a dispersant, a reducing agent or the like may be mixed. As the binder, for example, polyvinyl alcohol can be preferably used. As the mixed amount of binder, the concentration in the slurry is preferably set at about 0.5 to 2 wt %. As the dispersant, for example, polycarboxylic acid ammonium or the like can be preferably used. The mixed amount of dispersant is preferably set such that the concentration in the slurry is about 0.5 to 2 wt %. A lubricant, a sintering accelerator and the like may be mixed.

Then, the slurry produced as described above is wet-pulverized as necessary. For example, a ball mill or a vibration mill is used to perform the wet-pulverization for a predetermined period of time. The average particle diameter of the raw material after the pulverization is preferably equal to or less than 50 μm, and is more preferably equal to or less than 10 μm. In the vibration mill or the ball mill, a medium having a predetermined particle diameter is preferably provided. Examples of the material of the medium include an iron-based chrome steel and oxide-based zirconia titania and alumina. As the form of the pulverization step, either of a continuous method and a batch method may be used. The average particle diameter of the pulverized material is adjusted by a pulverization time, a rotation speed, the material and the particle diameter of the medium used and the like.

The pulverized slurry is granulated by being sprayed and dried. Specifically, the slurry is introduced into a spray drying machine such as a spray drier, is sprayed into an atmosphere and is spherically granulated. The temperature of the atmosphere at the time of spraying and drying preferably falls within a range of 100 to 300° C. In this way, it is possible to obtain spherical granules having an average particle diameter of 10 to 200 μm. Preferably, in the obtained granules, a vibrating screen or the like is used, and thus coarse particles and fine powder are removed, with the result that sharp particle size distribution is achieved.

Then, the obtained granules are put into a heated furnace and are fired to generate ferrite particles. With respect to the firing temperature and the firing atmosphere, a temperature range and an oxygen concentration range are preferably set such that the intended magnetic phase is generated, and when the ferrite particles of the present invention are manufactured, burning is preferably performed at a temperature range of 1000 to 1400° C. and an oxygen concentration of 100 to 20000 ppm. More preferably, heating is performed at a temperature range of 1000 to 1300° C. and an oxygen concentration of 100 to 6000 ppm, and cooling is preferably performed at an oxygen concentration of 5000 to 20000 ppm. The burning time preferably falls within a range of 1 to 6 hours, and more preferably falls within a range of 1 to 3 hours. Then, the ferrite particles are gradually cooled from the burning temperature to room temperature.

Then, when the ferrite particles are adhered to each other, they are separated into particles as necessary. Specifically, for example, a hammer mill or the like is used to separate the ferrite particles into particles. As the form of the particle separation step, either of a continuous method and a batch method may be used. Then, as necessary, in order to make the particle diameter fall within a predetermined range, classification may be performed. As a classification method, a conventional known method such as air classification or a sieve classification can be used. After primary classification is performed with an air classifier, a vibration sieve or an ultrasonic sieve may be used to make the particle diameter fall within the predetermined range. Furthermore, after the classification step, non-magnetic particles may be removed with a magnetic field beneficiation machine.

Thereafter, as necessary, the classified ferrite particles are heated in an oxidizing atmosphere, and thus an oxide film is formed on the surface of the particles, with the result that high resistance may be achieved. As the oxidizing atmosphere, either of the atmosphere and the mixed atmosphere of oxygen and nitrogen may be used, and the atmosphere having an oxygen concentration of 10 to 100% is more preferably used. The heating temperature preferably falls within a range of 200 to 700° C., and more preferably falls within a range of 250 to 600° C. The heating time preferably falls within a range of 0.5 to 20 hours.

When the ferrite particles of the present invention produced as described above are used as an electrophotographic development carrier, though the ferrite particles can be used as the electrophotographic development carrier without being processed, in terms of the charging property and the like, the surface of the ferrite particles is preferably coated with a resin.

As the resin with which the surface of the ferrite particles is coated, a conventional known one can be used, and examples thereof include polyethylene, polypropylene, polyvinyl chloride, poly-4-methylpentene-1, polyvinylidene chloride, ABS (acrylonitrile-butadiene-styrene) resin, polystyrene, (meth)acrylic resin, polyvinyl alcohol resin, thermoplastic elastomers such as polyvinyl chloride, polyurethane, polyester, polyamide and polybutadiene and fluorine silicone resin.

In order for the surface of the ferrite particles to be coated with a resin, a solution or a dispersion liquid of the resin is preferably applied to the ferrite particles. As the solvent for the coating solution, one or two or more types of aromatic hydrocarbon solvents such as toluene and xylene; ketone solvents such as acetone, methyl ethyl ketone, methyl isobutyl ketone and cyclohexanone; cyclic ether solvents such as tetrahydrofuran and dioxane; alcohol solvents such as ethanol, propanol and butanol; cellosolve solvents such as ethyl cellosolve and butyl cellosolve; ester solvents such as ethyl acetate and butyl acetate; and amide solvents such as dimethyl formamide and dimethylacetamide can be used. The resin component concentration in the coating solution generally falls within a range of 0.0010 to 30 wt % and particularly preferably falls within a range of 0.0010 to 2 wt %.

As the method of coating the ferrite particles with the resin, for example, a spray dry method, a fluid bed method, a spray dry method using a fluid bed, a dipping method or the like can be used. Among them, since it is possible to efficiently perform coating with a small amount of resin, the fluid bed method is particularly preferably used. In the fluid bed method, the resin coating amount can be adjusted by, for example, the amount of resin solution sprayed and a spraying time.

The electrophotographic developer of the present invention is formed by mixing the carrier produced as described above and the toner. The mixing ratio between the carrier and the toner is not particularly limited, and is preferably determined, as necessary, such as by the development conditions of a development device used. In general, the toner concentration in the developer preferably falls within a range of 1 to 20 wt %. This is because when the toner concentration is less than 1 wt %, the image concentration is excessively low whereas when the toner concentration exceeds 20 wt %, the toner scatters within the development device, with the result that disadvantageously, the device may become dirty or the toner may be adhered to a background part on transfer paper. The toner concentration more preferably falls within a range of 3 to 15 wt %.

The mixing of the carrier and the toner can be performed by using a conventional known mixing device. For example, a Henschel mixer, a V-type mixer, a tumbler mixer, a hybridizer or the like can be used.

EXAMPLES

Although examples of the present invention will be described in more detail below, the present invention is not limited to these examples.

Example 1

A mixture obtained by mixing 71.7 wt % of $Fe_2O_3$ (the average particle diameter: 0.6 μm) and 28.3 wt % of $Mn_3O_4$ (the average particle diameter: 2 μm) was heated at 900° C. for 2 hours in the atmosphere, and thus calcined powder was obtained. 20.0 kg of the calcined powder and 1.1 kg of Sr ferrite (the average particle diameter: 1.2 μm) were dispersed in 7.0 kg of water, as a dispersant, 239 g of poly- carboxylic acid ammonium-based dispersant was added, as a reducing agent, 60.2 g of carbon black was added and a wet-type ball mill (medium diameter: 2 mm) was used to perform pulverization processing, with the result that a mixed slurry was obtained.

The slurry was sprayed with a spray drier into hot air of about 130° C., and thus a dried granulated powder was obtained. Here, the granulated powder other than the intended particle size distribution was removed by a sieve. This granulated powder was put into an electric furnace, and was fired at 1110° C. for 3 hours. In the firing step, heating was performed in an atmosphere within the electric furnace having an oxygen concentration of 5000 ppm, and cooling was performed in an atmosphere within the electric furnace having an oxygen concentration of 15000 ppm. The obtained fired product was classified with a sieve after being separated into particles, and thus the average particle diameter was set at 35 μm.

Furthermore, on the obtained fired product, high-resistance processing was performed by being held at 440° C. under the atmosphere for 1 hour, with the result that ferrite particles were obtained.

Figure 1:
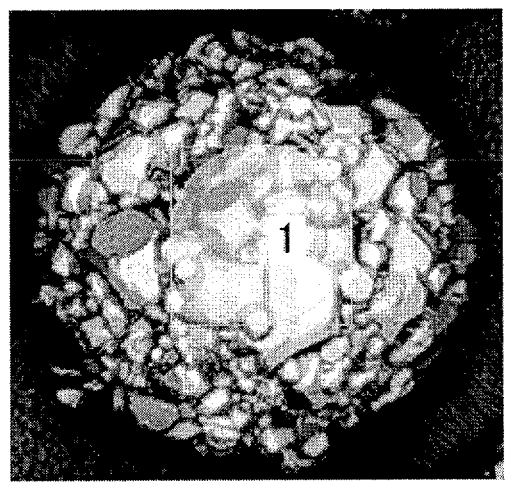
FIG. 1 A SEM photograph of ferrite particles in example 1.

The composition, the physical properties, the magnetic property, the electrical property and the mechanical property of the obtained ferrite particles were measured by the following methods. The results of the measurements are shown in table 2. FIG. 1 shows a SEM photograph of the ferrite particles.

With respect to the obtained ferrite particles, the value of a so-called x indicating a manganese composition ratio was 0.8, and the value of 3-x indicating an iron composition ratio was 2.2. It can be considered that the obtained crystalline phase was $MnFe_2O_4$, $SrO \cdot nFe_2O_3$ (n=0.5 to 6.5).

(Degree of Projections and Recesses in Surface of Ferrite Particles and Standard Deviation of Size of Grains)

Measurements were made with "VK-210, VK-X200" made by Keyence Corporation by the following procedure.
1. A carbon tape is stuck onto a prepared slide, and a sample is fixed thereon.
2. A scale bar of 25 μm is displayed on a microscope, and a field of view in which a few particles around 25 μm can be shot at a magnification of 3000 is searched.
3. Thereafter, brightness is automatically set, and an image is captured. While both the captured image and profile data are being checked, a horizontal line profile is manually drawn, the particle diameter is estimated and particles around 25 μm are analyzed.

(Degree of Projections and Recesses)

As pre-processing on the image, a peak noise is removed (cut level: normal). Then, with the top of the particles to be analyzed at the center, a 20 μm square area is specified and curvature correction (inclination correction, spherical correction (automatic)) is performed. Then, an approximate center of the top of the particles to be analyzed (particle top) of ϕ10 μm (the inside of an inscribed circle) is specified as a measurement area, and a cutoff (λs 0.25 μm, λc 0.08 mm) is performed. Thereafter, data is output, and a Rz value of each particle is measured as the degree of projections and recesses. In order for variations between particles to be considered, 100 particles are measured, and the average value thereof is assumed to be the degree of projections and recesses.

(Standard Deviation of Size of Grains)

As pre-processing on the image, a peak noise is removed (cut level: normal). Then, with the top of the particles to be analyzed at the center, a 20 μm square area is specified and curvature correction (inclination correction, spherical correction (automatic)) is performed. Then, (1) An approximate center of the top of the particles to be analyzed (particle top 10 μm square area) is specified as a measurement area, and 10 measurement lines having a length of 10 μm are determined.

(2) With respect to the 10 measurement lines, a light amount value is measured by line scan (cutoff (λs 0.25 μm, λc 0.08 mm)).

(3) On each of the measurement lines, the following measurement and calculation are performed.

A: With the assumption that the intermediate value of a light amount range is a reference plane, the bottom surface (width) of the peak over the reference plane is measured.

B: The standard deviation of the lengths of a plurality of widths measured is calculated (SD of each line)

(4) The average value of the values of SD of the 10 lines is assumed to be the SD of each particle.

(5) 100 particles are measured, and the average value thereof is assumed to be variations σ in crystal size listed in the table.

Figure 4:
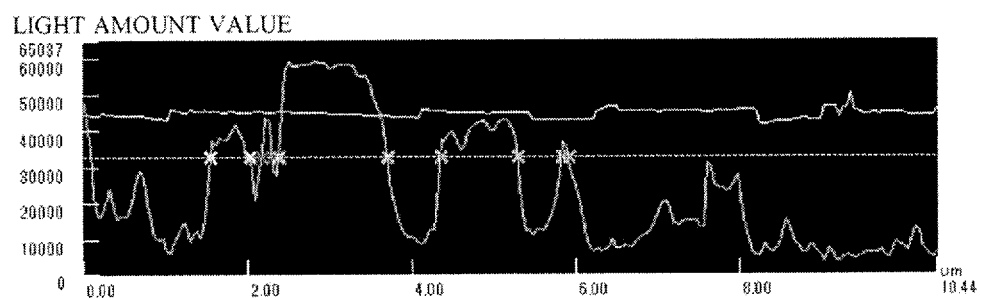
FIG. 4 A diagram illustrating a method of calculating the standard deviation a of the size of the grains on the surface of the ferrite particles.

FIG. 4 shows an example of the calculation of the standard deviation a of the size of grains on the surface of the particles.

(Magnetic Property)

A room temperature dedicated vibrating sample magnetometer (VSM) (made by Toei Industry Co., Ltd., VSM-P7) was used to measure a magnetization $\sigma_{1k}$ in an external magnetic field of 0 to 50000 (oersteds) by one continuous cycle application.

(BET Specific Surface Area)

A BET one point method specific surface area measuring device ("Macsob HM model-1208" made by Mountech Co., Ltd.) was used to put 8.500 g of the sample into a cell having a capacity of 5 mL, to perform degassing at 200° C. for 30 minutes and to make a measurement.

(Apparent Density)

A measurement was made according to JIS Z 2504.

(Charge Amount of Ferrite Particles)

9.5 g of ferrite particles and 0.5 g of a commercially available toner for a full-color machine were put into a glass bottle of 100 ml with a stopper, were left for 12 hours under an environment of a temperature of 25° C. and a relative humidity of 50% and thus humidity was adjusted. The ferrite particles and the toner whose humidity was adjusted were mixed by being shaken with a shaker for 30 minutes. Here, as the shaker, model NEW-YS made by YAYOI Co., Ltd. was used to perform shaking at a rate of 200 times/minute at angle of 60°. 500 mg of the ferrite particles and the toner mixed was weighed, and the charge amount was measured with a charge amount measuring device. As the charge amount measuring device, "model STC-1-C1" made by Nippon Piotec Co., Ltd. was used, and a suction pressure of 5.0 kPa and a suction mesh made of SUS and having a 795 mesh were used. The measurement was performed twice on the same sample, and the average value thereof was assumed to be the charge amount. The charge amount is calculated by formula below.

charge amount (μC/g)=actually measured electric charge (nC)×10³×coefficient (1.0083×10⁻³)/ toner weight where toner weight=(weight before suction (g)−weight after suction (g))

(Charge Amount of Carrier)

The charge amount of the carrier in which the surface of the ferrite particles was coated with the resin was measured in the same manner as the charge amount of the ferrite particles. The measurement was performed under an atmosphere of a temperature of 25° C. and a humidity of 50% RH.

(Strength of Ferrite Particles)

30 g of the ferrite particles was put into a sample mill ("model SK-M10" made by Kyoritsu-riko Co. Ltd.), and was agitated at a rotation speed of 14000 rpm for 60 seconds. Then, a laser diffraction particle size distribution measuring device ("Microtrac Model 9320-X100" made by Nikkiso Co., Ltd.) was used to measure a cumulative particle frequency in which the particle diameter was equal to or less than 22 μm. Then, a rate of increase (%) in the cumulative particle frequency in which the particle diameter was equal to or less than 22 μm caused by processing with the sample mill was calculated, and was used as an index. As the rate of increase is lower, it means that the strength of the particles is higher.

(Measurement of Average Particle Diameter)

The average particle diameters of the ferrite particles and the Sr ferrite particles were measured with ("Microtrac Model 9320-X100") made by Nikkiso Co., Ltd.

(Image Evaluation)

A silicone resin (SR2411 made by Toray Dow Corning Co., Ltd.) was dissolved in toluene, and a coating resin solution was prepared. Then, the ferrite particles and the resin solution were put into an agitator in a weight ratio of 9:1, and were heated and agitated at a temperature of 150 to 250° C. for 3 hours. Then, they were put into a hot air circulation heating device, heating was performed at a temperature of 250° C. for 5 hours, a coating resin layer was cured and thus a carrier was produced.

95 weight parts of the carrier and 5 weight parts of the toner having an average particle diameter of about 5 μm were mixed with a pot mill for a predetermined period of time, and thus an electrophotographic developer was produced. This two-component electrophotographic developer was put into an evaluation machine equivalent to a 60 cpm machine of digital reversal development system, and image evaluation was visually performed with the following criteria after the image formation of the initial sheet, 100 k sheets and 200 k sheets.

⊚: The test image was reproduced very well
○: The test image was almost reproduced
Δ: The test image was little reproduced
x: The test image was not reproduced at all Example 2

Ferrite particles were obtained in the same manner as in example 1 except that as the raw material, Sr ferrite having an average particle diameter of 2.5 μm was used. Then, physical properties and the like were measured in the same manner as in example 1. The results of the measurements are also listed in table 2.

Example 3

Ferrite particles were obtained in the same manner as in example 1 except that as the raw material, 0.55 kg of Sr ferrite having an average particle diameter of 2.5 μm was mixed so as to have the same composition as the ferrite particles of example 1. Then, physical properties and the like were measured in the same manner as in example 1. The results of the measurements are also listed in table 2.

Example 4

Ferrite particles were obtained in the same manner as in example 1 except that as the raw material, 2.2 kg of Sr ferrite having an average particle diameter of 2.5 μm was mixed so as to have the same composition as the ferrite particles of example 1. Then, physical properties and the like were measured in the same manner as in example 1. The results of the measurements are also listed in table 2.

Comparative Example 1

Ferrite particles were obtained in the same manner as in example 1 except that instead of the Sr ferrite particles, 146 g of $SrCO_3$ was mixed so as to have the same composition as the ferrite particles of example 1. Then, physical properties and the like were measured in the same manner as in example 1. The results of the measurements are also listed in table 2.

Comparative Example 2

Ferrite particles were obtained in the same manner as in example 1 except that as the raw material, 1.1 kg of Sr ferrite having an average particle diameter of 5.0 μm was mixed so as to have the same composition as the ferrite particles of example 1. Then, physical properties and the like were measured in the same manner as in example 1. The results of the measurements are also listed in table 2.

the carrier, a decrease in the charge amount after the printing of 200 k sheets was reduced, with the result that satisfactory images were obtained.

By contrast, in the ferrite particles of comparative example 1 using $SrCO_3$ as the raw material, the degree of projections and recesses in the surface of the particles was low so as to be 1.8 μm, and the standard deviation a of the size of grains appearing on the surface of the particles was high so as to be 4.0 μm and to have significant variations. In the ferrite particles of comparative example 2 using, as the raw material, the Sr ferrite having an average particle diameter of 5.0 μm, the degree of projections and recesses in the surface of the particles was high so as to be 5.0 μm, and the standard deviation a of the size of grains appearing on the surface of the particles was high so as to be 5.0 μm and to have significant variations. Hence, in the ferrite particles of comparative examples 1 and 2, both the charge amount and the strength were low. When these ferrite particles were coated with the resin and were used as the carrier, the charge amount after the printing of 100 k sheets was significantly lowered, with the result that the reproduction of the image was degraded. Then, after the printing of 200 k sheets, the charge amount was further significantly lowered, with the result that the image was not reproduced at all.

INDUSTRIAL APPLICABILITY

The ferrite particles of the present invention are useful because even after long-term use, a coating resin on the surface of particles is partially left to reduce a decrease in the charge property.

TABLE 1

| | | Sr ferrite particles | | | |
|---|---|---|---|---|---|
| | Calcined powder | Average particle diameter | Added amount | | Added amount of |
| | kg | μm | kg | wt % | $SrCo_3$ g |
| Example 1 | 20 | 1.2 | 1.1 | 5.5 | — |
| Example 2 | 20 | 2.5 | 1.1 | 5.5 | — |
| Example 3 | 20 | 2.5 | 0.55 | 2.8 | — |
| Example 4 | 20 | 2.5 | 2.2 | 11.0 | — |
| Comparative example 1 | 20 | — | — | — | 146 |
| Comparative example 2 | 20 | 5.0 | 1.1 | 5.5 | — |

The invention claimed is:

1. Ferrite particles in which Mn ferrite is used as a main phase and which contain Sr ferrite,
   wherein a degree of projections and recesses in a surface of the particles falls within a range of 2.5 to 4.5 μm, and a standard deviation of a size of grains appearing on the surface of the particles falls within a range of 1.5 to 3.5 μm.

TABLE 2

| | Degree of projections and recesses | Standard deviation σ | $σ_{1k}$ | BET specific surface area | Apparent density | Ferrite particles | | Charge amount (25° C., 50% RH) μC/g | | | Image evaluation | | |
|---|---|---|---|---|---|---|---|---|---|---|---|---|---|
| | | | | | | Charge amount μC/g | Strength % | 0k sheets | 100k sheets | 200k sheets | 0k sheets | 100k sheets | 200k sheets |
| | Rz μm | μm | $Am^2/kg$ | $m^2/g$ | $g/cm^3$ | | | | | | | | |
| Example 1 | 3.5 | 1.5 | 57.9 | 0.179 | 2.22 | 19.2 | 1.0 | 25 | 22 | 21 | ◉ | ◉ | ◉ |
| Example 2 | 4.2 | 2.3 | 57.8 | 0.186 | 2.12 | 19.5 | 0.8 | 25 | 23 | 21 | ◉ | ◉ | ◉ |
| Example 3 | 3.1 | 1.6 | 58.5 | 0.141 | 2.31 | 17.8 | 1.1 | 24 | 21 | 20 | ◉ | ◉ | ◉ |
| Example 4 | 4.5 | 3.3 | 55.6 | 0.215 | 2.08 | 18.3 | 1.2 | 25 | 19 | 17 | ◉ | ○ | ○ |
| Comparative example 1 | 1.8 | 4.0 | 57.4 | 0.255 | 3.05 | 16.5 | 5.3 | 23 | 12 | 6 | ◉ | Δ | X |
| Comparative example 2 | 5.0 | 5.0 | 57.8 | 0.199 | 2.15 | 12.5 | 6.6 | 25 | 16 | 10 | ◉ | Δ | X |

As understood from table 2, in the ferrite particles of examples 1 to 4 using the Sr ferrite particles as the raw material, the degree of projections and recesses in the surface of the particles was 3.1 to 4.5 μm, the standard deviation of the size of grains appearing on the surface of the particles was 1.5 to 3.3 μm and the charge amount and the strength were high. When the ferrite particles of examples 1 to 4 were coated with the resin and were used as 2. An electrophotographic development carrier, wherein the surface of the ferrite particles of claim 1 is coated with a resin.

3. An electrophotographic developer comprising:
the electrophotographic development carrier of claim 2; and
a toner.

* * * * *